United States Patent
Shinar et al.

(10) Patent No.: US 11,313,173 B2
(45) Date of Patent: Apr. 26, 2022

(54) SMART ELECTRIC SHADES SYSTEM, AND ITS METHOD OF OPERATION

(71) Applicant: OLIBRA LLC, Cresskill, NJ (US)

(72) Inventors: Zohar Shinar, Demarest, NJ (US); Christopher Andrew Merck, Sussex, NJ (US)

(73) Assignee: OLIBRA LLC, Cresskill, NJ (US)

( * ) Notice: Subject to any disclaimer, the term of this patent is extended or adjusted under 35 U.S.C. 154(b) by 542 days.

(21) Appl. No.: 16/411,164

(22) Filed: May 14, 2019

(65) Prior Publication Data

US 2020/0362624 A1 Nov. 19, 2020

(51) Int. Cl.
*E06B 9/264* (2006.01)
*H04W 4/33* (2018.01)
*H04W 4/80* (2018.01)
*E06B 9/42* (2006.01)

(52) U.S. Cl.
CPC ............... *E06B 9/264* (2013.01); *E06B 9/42* (2013.01); *H04W 4/33* (2018.02); *H04W 4/80* (2018.02)

(58) Field of Classification Search
CPC ............ E06B 9/264; E06B 9/42; H04W 4/33; H04W 4/80; H04W 4/20; H04W 4/30; H04W 4/70
USPC ............................................. 160/1
See application file for complete search history.

(56) References Cited

U.S. PATENT DOCUMENTS

| | | | | |
|---|---|---|---|---|
| 8,665,111 | B2 * | 3/2014 | Wang | G06Q 30/0621 |
| | | | | 340/870.02 |
| 10,017,985 | B2 * | 7/2018 | Lundy | E06B 9/68 |
| 10,392,860 | B2 * | 8/2019 | Barnett | E06B 9/368 |
| 10,550,637 | B2 * | 2/2020 | Selogy | E06B 9/72 |
| 10,676,990 | B2 * | 6/2020 | Delvecchio | E06B 9/42 |
| 10,876,354 | B2 * | 12/2020 | Rivera | E06B 9/72 |
| 10,934,774 | B2 * | 3/2021 | Campagna | E06B 9/42 |
| 11,026,177 | B1 * | 6/2021 | Chung | H04R 29/004 |
| 2014/0258357 | A1 * | 9/2014 | Singh | G06F 9/4856 |
| | | | | 709/201 |
| 2016/0135241 | A1 * | 5/2016 | Gujral | H04L 67/12 |
| | | | | 370/328 |
| 2018/0061418 | A1 * | 3/2018 | Patil | G10L 15/28 |
| 2020/0196372 | A1 * | 6/2020 | Ouyang | H04L 65/60 |
| 2020/0396098 | A1 * | 12/2020 | Shinar | H04L 12/2832 |

* cited by examiner

Primary Examiner — Beth A Stephan
(74) Attorney, Agent, or Firm — Eitan Mehulal Sadot (57) ABSTRACT

Smart electric shades system, and its method of operation. A smart electric shades (SES) device includes a window blind, and a motor able to open and close the window blind. The SES device includes a Wi-Fi transceiver able to receive an incoming Wi-Fi signal indicating a remote command to control another SES unit that is external to and separate from that SES device. The SES device also includes a non-Wi-Fi reduced-power wireless transceiver, to send to that other SES unit a non-Wi-Fi wireless communication signal, based on the incoming Wi-Fi command, indicating the remote command to control that other SES unit.

20 Claims, 1 Drawing Sheet

SMART ELECTRIC SHADES SYSTEM, AND ITS METHOD OF OPERATION

FIELD

Some embodiments relate to the field of home appliances and home automation systems.

BACKGROUND

Millions of people worldwide utilize electronic devices for various purposes on a daily basis. For example, people utilize a laptop computer, a desktop computer, a smartphone, a tablet, and other electronic devices, in order to send and receive electronic mail (e-mail), to browse the Internet, to play games, to consume audio/video and digital content, to engage in Instant Messaging (IM) and video conferences, to perform online banking transactions and online shopping, and to do various other tasks.

In the last few years, an Internet of Things (IoT) approach has introduced Internet connectivity into various devices, such as security cameras, smoke detectors, or the like.

SUMMARY

The present invention provides a system of electric shades, as well as a method of operation of such system, and a method of communication among components of an electric shades system. For example, a smart electric shades (SES) device includes a window blind, and a motor able to open and close the window blind. The SES device includes a Wi-Fi transceiver able to receive an incoming Wi-Fi signal indicating a remote command to control another SES unit that is external to and separate from that SES device. The SES device also includes a non-Wi-Fi reduced-power wireless transceiver, to send to that other SES unit a non-Wi-Fi wireless communication signal, based on the incoming Wi-Fi command, indicating the remote command to control that other SES unit.

DETAILED DESCRIPTION OF SOME DEMONSTRATIVE EMBODIMENTS OF THE PRESENT INVENTION

The term "Sub-1 GHz" (or "Sub-One GHz") as used herein includes wireless communication signals in the electromagnetic spectrum range of 70 MHz to 1 GHz, or a particular frequency or frequency-band or frequency-range that is below 1 GHz, or a group or batch or set of such discrete frequencies (each frequency being in the range of 70 MHz to 1 GHz), or a frequency of 315 MHz, or 415 MHz, or 426 MHz, or 433 MHz, or 434 MHz, or 468 MHz, or 470 MHz, or 779 MHz, or 863 MHz, or 915 MHz, or 920 MHz, or in the range of 769 to 925 MHz, or in the range of 300 to 950 MHz; or wireless communication signals in the band 40.66-40.70 MHz and above 70 MHz; or wireless communication signals at a frequency in the range of 40.66 to 40.70 MHz or in the range of 70 MHz to 999.99 MHz.

For demonstrative purposes, the discussion herein may relate to a system of multiple Smart Electric Shades (SES) units which communicate with each other and/or with a wireless router. However, this is only a non-limiting example; and embodiments of the present invention may similarly comprise a set of other type of home devices or appliances, which need not necessarily be Smart Electric Shades (SES) units; for example, smart or Internet-connected or Internet Protocol (IP) connected televisions or smoke detectors or CO detectors or fire detectors or fridges or thermostats or garage door systems or ceiling fans or countertop appliances or wall-integrated appliances or kitchen appliances or security cameras or doorbells or doorbell cameras or other suitable devices, which may communicate among themselves by using the methods of the present invention; and such group or set of devices may optionally comprise devices of different types (e.g., a group of devices which includes a smart smoke detector, a smart garage door opening system, and a smart ceiling fan).

The Applicants have realized that a conventional electric shade cannot be easily converted or upgraded or modified into a "smart" or Internet-connected electric shade, due to various obstacles or barriers; and particularly since such modification may require electric re-wiring of the electric shade towards the mains electricity, and/or since a battery-operated electric shade would rapidly consume the limited power capacity that a battery provides.

The present invention provides a gateway election process and/or a process for selectively assuming a gateway role by one particular electric shade unit, for a multi-protocol network of battery-powered smart electric shades; and embodiments of the present invention may improve the battery life of such network of Wi-Fi-connected smart electric shades, to the point that it would become practical and efficient to install and operate such system of multiple smart electric shades without necessarily requiring all of them (or some of them, or at least one of them) to be connected to (or to be, or to include) a mains-powered communications gateway.

The present invention provides a unique architecture for implementing battery-powered (non-mains powered) Wi-Fi connected devices in the smart home environment or in a home automation system. The Applicants have realized that in a Wi-Fi connected device, the Wi-Fi transceiver consumes a significant amount of power, which drains the battery and makes it prohibitive to implement a battery-operated device that is Wi-Fi connected yet non-mains-connected, unless at some point the battery-operated device is connected to a mains electric outlet to re-charge its battery (e.g., as commonly done for smartphones or tablets).

The Applicants have also realized that electric shades are typically purchased or installed in groups or in batches; such that a typical home-owner or venue-owner, rarely purchases or rarely installs a single unit of electric shade; but rather, typically purchases and installs a plurality of such electric shade units co-located in the same venue (home, residence, office).

In accordance with the present invention, a system of Smart Electric Shade (SES) units are installed, and are co-located in the same venue (home, residence, house, office, or the like). Each SES unit comprises a Wi-Fi transceiver, as well as: (i) a low-power Sub-1 GHz, and/or (ii) a low-power Bluetooth Low Energy (BLE) or Bluetooth Mesh or BLE Mesh transceiver.

In accordance with the present invention, out of the plurality of SES units in the venue, only one SES unit (or, in some embodiments, only some but not all of the co-located SES units) at any given time operates as the "primary" or the "master" SES unit, which is Internet connected and is "listening for" (receiving) incoming Wi-Fi signals that are directed to control the primary SES unit or are directed to control one of the other SES units (which are referred to as "secondary" or "slave" SES units). The primary SES unit has its Wi-Fi transceiver activated and fully operational; whereas, the secondary SES units have their Wi-Fi transceivers powered-down or deactivated or turned-off or in reduced-power mode or in sleep mode or in stand-by mode or in power-saving mode.

The primary SES unit receives an incoming Wi-Fi signal that indicates a command of the user (e.g., the venue owner) to modify an operational setting of a particular secondary SES units. The primary SES unit generates and transmits to that secondary SES unit a different wireless communication signal, over Sub-1 GHz or BLE communication link, representing or indicating the command to modify the operational setting of the target SES unit. The target SES unit receives the local Sub-1 GHz/BLE signal, and executes the command; even though the target SES unit still has its Wi-Fi transceiver turned-off or deactivated or in non-operational state or in reduced-power mode.

This configuration enables multiple SES units to be Internet connected, via a single SES unit that acts as the "master" or "primary" unit or as the Internet Gateway, which receives incoming remote command via Wi-Fi, and then transmits a low-power or reduced-power wireless communication signal (e.g., over Sub-1 GHz or BLE) to the relevant "secondary" or "slave" SES unit which still has its Wi-Fi transceiver turned off yet is still able to be Internet-connected via this method; thereby enabling the SES units, or at least some of them, to be battery-powered and to function for weeks or months or even years without the need to be connected to a mains power outlet. In some embodiments, a single button-type Lithium battery may suffice to provide power to the Sub-1 GHz (or BLE) transceiver for 1 year, or for 5 years, or even for 10 or 15 years in some implementations.

Subsequently, the primary SES unit detects that its own battery is drained to below a pre-defined threshold value (e.g., below 25 percent of its full battery capacity); and upon such detection, the primary SES unit sends a "wake up" command over the low-power wireless communication medium (e.g., over Sub-1 GHz or BLE) to one (or to some) of the secondary SES units; thereby commanding another particular SES unit (or, commanding at least one of the other SES units) to turn-on or activate or fully-operated its own Wi-Fi transceiver and to take the role of the "master" or "primary" SES unit or the role of the Internet Gateway, instead of the previous SES unit that has acted as "primary" SES unit and can now deactivate or turn-off its Wi-Fi transceiver and switch itself to becoming a "secondary" SES unit. Accordingly, once a particular SES unit that operates as the primary unit, detects that its own battery is about to be drained, it passes the role of operating as the Wi-Fi master to the next SES unit, and it switches or modifies itself to operate as a secondary SES unit.

This way, the multiple SES units may average out among them the additional power consumption that is required for being Wi-Fi connected; and such power consumption is now split or divided across multiple such SES units, which are powered, in turn, by multiple respective batteries; that need to serve only a single Wi-Fi transceiver that is operational at any given point in time.

For example, a demonstrative system may include four SES units, each one equipped with a Wi-Fi transceiver and with a battery having a power capacity that can power the Wi-Fi transceiver for N days of continuous full-blown operation. If each Wi-Fi transceiver is operational all the time, then each one of the four SES units is Internet-connected for N days; and after N days, they all exhaust their batteries and are not Internet-connected anymore. However, if only one of the four Wi-Fi transceivers is operational at any given time, the four SES units may be Internet connected for a prolonged period of up to 4N days, or for approximately 3N or 3.5 N days (e.g., taking into account possible imperfections of an implementations, or some power consumed by the additional low-power Sub-1 GHz or BLE transceiver).

Additionally, the system of the present invention may enable multiple such battery-powered (non-mains powered) SES units to connect directly to a local Home Automation Device (HAD), such as Amazon Echo which utilizes the virtual assistant Alexa, without necessarily utilizing a communications hub or a communication switch; thereby enabling to implement such system more rapidly, with less complexity, with fewer devices to install and configure and maintain, and in a method that it more robust and is less error-prone.

Figure 1:
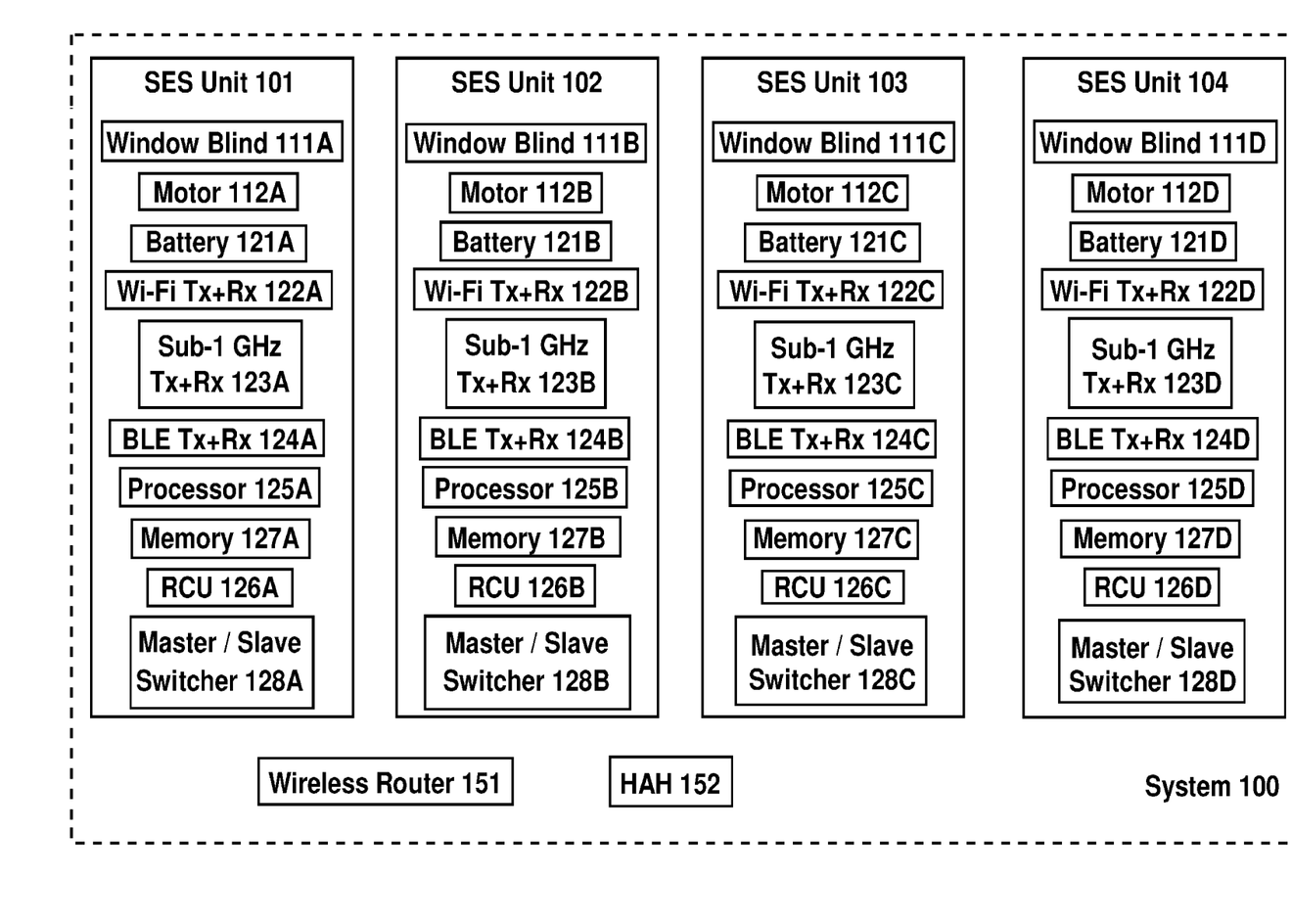
FIG. 1 is a block diagram illustration of a system, in accordance with some demonstrative embodiments of the present invention.

Reference is made to FIG. 1, which is a schematic block-diagram illustration of an electric shades system 100, in accordance with some demonstrative embodiments of the present invention. System 100 may comprise two or more Smart Electric Shade (SES) units, which are installed or co-located in a home or residence or office or other venue. For demonstrative purposes, four such SES units 101-104 are shown, although other number of SES units may be included in system 100.

SES unit 101 comprises a window blind 111A, which is able to cover a window or an aperture; and which is opened and closed by an electric motor 112A which is able to move the window blind or portions thereof (e.g., able to roll the window blind, unroll it, lift it, pull it, push it, fold it, unfold it, shrink it, expand it, compress it, extend it, or otherwise modify the area that the window blind is covering). The electric motor is connected to a mains electricity outlet 113A.

SES unit 101 further comprises a battery 121A (e.g., a stand-alone electricity-storing cell, that is not mains electricity and is not connected to mains electricity); a Wi-Fi transceiver 122A able to transmit and receive wireless communication signals via 802.11 protocol(s); a Sub-1 GHz wireless transceiver 123A able to transmit and receive wireless communication signals via Sub-GHz wireless communication; a Bluetooth Low Energy (BLE) transceiver 124A; a processor 125A or other suitable controller or Integrated Circuit (IC) or Application-Specific Integrated Circuit (ASIC) or other logic unit; and optionally a memory unit 127A.

The Sub-1 GHz transceiver 123A may be or may comprise, for example, one or more of the following components or chips of system-on-a-chip (SoC) available from "Texas Instruments" (TI) of Dallas, Tex., USA: model CC1120, model CC1125, model CC1200, model CC11xL, model CC1121, model CC1201, model CC1110, model CC1111, model CC430, model CC11290, model CC12x, model CC120X, model CC11xL, model CC115L, model CC1190, or other suitable components.

SES unit 101 may be operable associated with a portable or hand-held Sub-1 GHz or BLE remote control unit (RCU) 126A, which may be used to operate this particular SES unit 101 via Sub-GHz wireless communication signals indicating an operational command (e.g., shades up; shades down; stop shades movement). In some embodiments, the portable Sub-GHz remote control unit 126A may control only one specific SES unit 101, and not other SES units (102, 103, 104) even if they are co-located nearby or in the same venue.

Each one of SES unit 102, SES unit 103, and SES unit 104, may comprise similar components to those of SES unit 101; they are depicted in the drawing with numerals ending with B (for SES unit 102), or ending with C (for SES unit 103), or ending with D (for SES unit 104).

Each portable Sub-GHz remote control unit (126A, 126B, 126C, 126D) is able to control only its respective SES unit (101, 102, 103, 104; respectively), directly and locally within the venue in which the SES units (101-104) are installed, regardless of whether or not that particular SES unit (or, any of the SES units) is currently connected to the Internet or to any cloud-based platform.

The user (e.g., a home-owner) may connect one or more of the SES units 101-104, directly or indirectly as described herein, to a cloud-computing platform and/or to the Internet, optionally by utilizing a mobile application or "app" running on a smartphone or tablet or smart-watch or other electronic device, and/or by utilizing a browser-based or web-based application or interface, and/or by utilizing a WebGUI-based configuration interface which may be hosted by or from or at the hardware of the SES unit itself.

For example, the venue in which the SES units 101-104 are located, may be a home or a residence or an office having Internet access serviced by an Internet Service Provider (ISP), which is accessible wirelessly via a Wireless Router 151 that sends and receives 802.11 wireless communication signals. One or more of the SES units 101-104 may communicate directly with the Wireless Router 151 over Wi-Fi, and may thus be Internet-connected; thereby enabling the owner of the venue to remotely control (e.g., modify an operational property of) such SES unit(s) via another Internet-connected device (e.g., laptop computer, desktop computer, smartphone, tablet, smart-watch, smart television, gaming console, or the like).

Additionally or alternatively, one or more of the SES units 101-104 may be connected to the Internet via a Home Automation Hub (HAH) 152 (or, Home Automation Device (HAD), or similar device), which in turn may be connected to the Internet; for example, a SES unit may communicate with the HAH 152 (or vice versa) over a local direct Wi-Fi link (e.g., such that a Wi-Fi signal is transmitted by the SES unit and is directly received by the nearby HAH 152, without going through the Wireless Router 151); and the HAH 152, in turn, is connected to the Internet via the Wireless Router 151; thereby enabling such SES unit to be Internet-connected via the HAH 152 and/or the Wireless Router 151.

In some embodiments, for example, the user initiates a set-up process by pressing a setup button on the first SES unit. The button-push causes this SES unit to "wake up" (e.g., from a sleep mode or a reduced-power mode), and to broadcast or transmit wireless communication signals as a Wi-Fi Access Point (AP), enabling the user to wirelessly connect to this SES unit using his smartphone or tablet or computer or other Internet-connected device; the user may connect directly to the Config AP and use an integrated WebGUI. The user may thus be able to connects this first SES unit to the user's Wi-Fi network or Wi-Fi router, by inputting the relevant Wi-Fi network credentials (e.g., Wi-Fi password). The user may then proceed to similarly set up each additional SES unit, in a similar process, such that each SES unit becomes Internet connected via the (same) Wi-Fi router of the user's home. Optionally, each one of those SES units may further be associated with a unique Venue Account or User Account, that is associated with that user or that venue; in order to later enable the user to efficiently control or manage multiple SES units. Other suitable methods may be used to configure or to set-up the plurality of SES units 101-104, such that at least one of them would be Internet-connected, directly through the Wireless Router 151, or indirectly via the HAH 152 and then the Wireless Router 151.

One of the SES units, such as SES unit 101, operates as an Internet-connected SES or as a cloud-computing connected SES or as a "primary" SES unit or as a "leader" SES unit or as a "master" SES unit. For example, the primary SES unit 101 is capable of receiving a request to control (e.g., to modify an operational setting of) another SES unit (e.g., SES unit 102) in this venue: the primary SES unit generates and transmits a local (e.g., short range, short distance) Sub-GHz wireless signal that conveys such modification command to the other SES unit 102 (which may be referred to as a "secondary" SES unit, or as a "follower" SES unit, or as a "slave" SES unit). The Sub-GHz wireless control signal that is generated by the Internet-connected primary SES unit 101 may be, for example, an exact replica or a duplication of, or may be identical to, or may be sufficiently similar to, a wireless control signal that would be generated and transmitted by the original hand-held or portable remote control unit 126B of the secondary SES unit 102.

System 100 may utilize or implement an automatic gateway election process, in which one particular SES unit is elected to operate as the primary SES unit that is Internet-connected and that conveys messages or commands to the other SES units over a local or ad-hoc Sub-1 GHz communication signal or a BLE communication signal; wherein the conveyed messages or commands may be, for example: (i) a command to a secondary SES unit to become a primary SES unit, and to activate or turn-on its Wi-Fi transceiver and to assume the role of primary SES unit; (ii) a command to a secondary SES unit to modify one or more of its operational settings (e.g., begin shade-up operation; stop shade-up operation; begin shade-down operation; stop shade-down operation; stop any currently-ongoing shade movement operation; move shade fully up; move shade fully down; spin or rotate angle of shades; or the like).

For example, each one of the SES units 101-104, may comprise a Master/Slave Switcher (denoted, respectively, 128A-128D), which may be responsible one or more of the operations that are described above or herein, with regard to switching on and off its own Wi-Fi transceiver, switching from operating as a Master Wi-Fi gateway for other SES units (a Master unit, which receives an incoming Wi-Fi signal with an operational command destined to another SES unit, and transmits a non-Wi-Fi signal to that other SES unit) to being a Slave unit (that has its Wi-Fi transceiver turned off or at reduced-power mode, and receives a non-Wi-Fi command relayed to it via a Master SES unit which received the operational command via Wi-Fi), activating or deactivating components, switching between operational modes, effecting changes to one or more operational parameters of components, triggering a local and/or a remote component to change its operational property, participating in a voting or selection process to elect which particular SES unit would become the Master Gateway and which one(s) would be the "slave" or secondary SES units, and/or perform any other suitable operation that is described above or herein.

In some embodiments, each one of the SES units is associated with two parameters: (a) the unique Sub-1 GHz Address of that SES unit (e.g., a unique 8-bit address identifying the particular SES unit out of all the SES units that are installed at the same venue or that are associated with the same smart home account); (b) a Battery Power Level indicator, e.g., a 3-bit number indicating the remaining battery power of that SES unit (optionally, with the highest value reserved to indicate that the SES unit is mains-powered).

Various Sub-1 GHz signals (or BLE signals) may be used to coordinate the SES units in system 100, to ensure that all the SES units can be accessed by a remote user via the Internet through least one operational Wi-Fi connected/Internet-connected SES unit, while minimizing (e.g., to one) the number of simultaneously operating gateways. Such signals may include, for example: a "Gateway Connect" signal, indicating to a SES unit to become a primary SES unit; or a "Gateway Disconnect" signal, indicating to a SES unit to become a secondary SES unit.

When a SES unit is operating as a primary SES unit or as the Gateway which is actively connected to the home Wi-Fi network, that primary SES unit may (e.g., periodically, such as every 15 minutes; or non-periodically, such as, every pseudo-random time-period in the range of 14 to 18 seconds) transmit a Sub-1 GHz (or BLE) "Gateway Connect" wireless communication signal carrying a message that indicates an identifier that is unique within that customer account or that smart home account. The secondary SES units in that venue, detect and receive such "Gateway Connect" signal, and thus know that there exists at least one other SES unit that operates as primary, and thus such secondary SES units maintain their Wi-Fi sleep mode and/or enter Wi-Fi sleep mode (or turn-off or deactivate their Wi-Fi transceivers; or switch their Wi-Fi transceivers to reduced-power mode or stand-by mode).

If the primary SES unit that acts as the Gateway, loses or is about to lose its Internet connection or Cloud connection, due to one or more possible reasons (e.g., due to low battery power remaining; due to a scheduled restart or "re-boot"; due to an accidental or non-planned restart or "re-boot"; due to a user-requested or user-triggered shutdown or restart; due to loss of connectivity; or the like), the primary SES unit transmits a "Gateway Disconnect" signal (over Sub-1 GHz and/or over BLE), immediately upon such condition and/or prior to turning-off its Wi-Fi transceiver. The other SES units receive that signal, and may utilize a pre-defined selection method to determine which other SES unit would now become the primary SES unit. The selection method may be, for example: (a) the first of the secondary SES units, that receives the "Gateway Disconnect" signal, and is the first one to transmit by itself a "Gateway Connect" signal indicating that this SES unit is now the primary one, becomes the primary SES unit, and other SES units do not attempt to override or to become primary SES units if another SES unit has transmitted a "Gateway Connect" signal in the most-recent N seconds (e.g., in the most-recent 10 seconds); or, (b) a voting mechanism may be implemented, in which each SES unit (or, at least some of the SES units) share or transmit their current battery power level and listen to (receive) the values of battery power levels of the other SES units, such that each SES unit is able to determine, within a few seconds, whether it has the highest value of remaining battery power (and thus it becomes the primary SES unit) or whether another SES unit has the highest value of remaining battery power; or (c) a selection method in which SES units take the role of operating as primary SES unit based on a pre-defined list or ordering criteria, such as, based on serial numbers or identification numbers of the SES units, such that the role of primary SES unit falls-back from SES unit 101, to SES unit 102, to SES unit 103, and so forth based on their serial number or other identifier; or (d) a selection mechanism that uses a round-robin rotation algorithm (e.g., instead of utilizing the SES unit that has the largest value of remaining battery power, or instead of utilizing a particular SES unit to act as primary for as long as it can still do so). Other selection or election methods may be used.

Some embodiments of the present invention may further feature an efficient Setup Process for a system of multiple SES units; by utilizing a Sub-1 GHz (or BLE) wireless signal indicating "Discovery". For example, the first SES unit that is already configured (e.g., is already Internet-connected; is already associated with or registered in a home automation account), transmits over Sub-1 GHz (or BLE) a "Discovery" signal; which triggers other SES units in that venue to temporarily wake up their Wi-Fi transceiver from sleep mode and to transmit or broadcast their Config Access Point (AP) signal, thereby eliminating the need to enter a unique PIN or code or password during setup of multiple SES units. The user can now utilize an electronic device (e.g., smartphone, tablet, computer) to connect to such SES unit which operates as a Wi-Fi Access Point (AP), without the need for engaging or tapping a physical button on each SES unit. Additionally or alternatively, the set-up process may further include transmitting of Wi-Fi credentials (e.g., SSID and Wi-Fi password) over an ad-hoc Wi-Fi network or over a local Wi-Fi Mesh Network, which may co-exist with the Gateway connections, and may only be used during the setup of the SES system.

All the SES units in system 100 may thus be accessible via a HAD (e.g., Amazon Echo with virtual assistant Amazon Alexa, or similar HAD and/or smart-speakers). However, only one particular SES unit is actually connected to the customer's Wi-Fi wireless router at any given point in time; whereas the other (secondary) SES units communicate over a low-power wireless communication protocol (e.g., BLE or Sub-1 GHz) with the primary SES unit. The role of the primary SES unit is rotated among the SES units; for example, preferring the SES unit which currently has the largest value of remaining battery power. This way, the system's latency is kept low (e.g., the time that elapses from user request to response), whereas the power consumption is distributed across several SES units, and thus extending the time before battery replacement is needed.

In some embodiments, optionally, a mains-powered SES unit may permanently operate as the primary SES unit; whereas the other SES units, which are battery powered, may permanently operate as secondary SES units. This configuration may still enable relatively rapid or efficient or easy deployment of multiple SES units in a venue; since, for example, only a single SES unit needs to be connected to mains power, whereas all other SES units in the same venue can be battery operated, thereby facilitating and expediting the installation process of a set of SES units, and reducing its cost and its implementation time.

Some embodiments may include an electric shades system, comprising: a first electric shade located at a first location; operably coupled to a first electric shade motor able to selectively open and close the first electric shade; and operably coupled to a first battery-operated wireless transceiver able to at least: (i) communicate over Wi-Fi with a Wi-Fi access point, and also (ii) communicate via a non-Wi-Fi low-energy wireless communication protocol with one or more other electric shades of said system. The low-energy wireless communication protocol is one of: (I) Bluetooth Low Energy (BLE), or (II) Sub-1 GHz wireless communication protocol, or (III) 433 MHz wireless communication protocol, or (IV) 863 MHz wireless communication protocol, or (V) 915 MHz wireless communication protocol. The system further comprises a second electric shade located at a second location (e.g., co-located at the same venue or residence or office as the first electric shade); operably coupled to a second electric shade motor able to selectively open and close the second electric shade; and operably coupled to a second battery-operated wireless transceiver able to at least: (i) communicate over Wi-Fi with said Wi-Fi access point, and also (ii) communicate via said non-Wi-Fi low-energy wireless communication protocol with one or more other electric shades of said system. During a first time-slot, the first battery-operated wireless transceiver is in Wi-Fi communication with said Wi-Fi access point; and the second battery-operated wireless transceiver is in Wi-Fi sleep mode, and is not in Wi-Fi communication with said Wi-Fi access point, and awaits to be awaken from Wi-Fi sleep mode by a low-energy wireless signal incoming over said low-energy wireless communication protocol from the first battery-operated wireless transceiver. During a second time-slot, that is different from and is not overlapping with the first time-slot: the second battery-operated wireless transceiver is in Wi-Fi communication with said Wi-Fi access point; and the first battery-operated wireless transceiver is in Wi-Fi sleep mode, and is not in Wi-Fi communication with said Wi-Fi access point, and awaits to be awaken from Wi-Fi sleep mode by a low-energy wireless signal incoming over said low-energy wireless communication protocol from the second battery-operated wireless transceiver.

In some embodiments, a smart electric shade (SES) device comprises: a window blind; a motor able to open (or pull-up, or roll-up) and close (or pull-down, or roll-down) the window blind; a Wi-Fi transceiver able to receive an incoming Wi-Fi signal indicating a remote command to control another SES unit that is external to and separate from said SES device; a non-Wi-Fi reduced-power wireless transceiver, to send to said other SES unit a non-Wi-Fi wireless communication signal, based on said incoming Wi-Fi command, indicating said remote command to control said other SES unit.

In some embodiments, the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit.

In some embodiments, the non-Wi-Fi reduced-power wireless transceiver is a Bluetooth Low Energy (BLE) transceiver which is configured to send to said other SES unit a BLE wireless communication signal, based on said incoming Wi-Fi command, indicating said remote command to control said other SES unit.

In some embodiments, the Wi-Fi transceiver is battery powered and is non-mains powered; wherein the SES device switches said Wi-Fi transceiver between (i) a first operational mode in which said SES device operates as an Internet gateway for a plurality of SES devices and in which said Wi-Fi transceiver is activated, and (ii) a second operational mode in said other SES unit operates as the Internet gateway and in which said Wi-Fi transceiver of said SES device is deactivated.

In some embodiments, the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit; wherein said Sub-1 GHz transceiver transmits to the other SES unit said Sub-1 GHz wireless communication signal at a frequency selected from the group consisting of: 315 MHz, 415 MHz, 426 MHz, 433 MHz, 434 MHz, 468 MHz, 470 MHz, 769 MHz, 779 MHz, 863 MHz, 915 MHz, 920 MHz, 925 MHz.

In some embodiments, the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit; wherein said Sub-1 GHz transceiver transmits to the other SES unit said Sub-1 GHz wireless communication signal at a frequency that is greater than 300 MHz and is smaller than 950 MHz.

In some embodiments, wherein the Wi-Fi transceiver is battery powered and is non-mains powered; wherein the SES device switches said Wi-Fi transceiver between (i) a first operational mode in which said SES device operates as an Internet gateway for a plurality of SES devices and in which said Wi-Fi transceiver is activated, and (ii) a second operational mode in said other SES unit operates as the Internet gateway and in which said Wi-Fi transceiver of said SES device is deactivated; wherein said Wi-Fi transceiver is switched from the first operational mode to the second operational mode if (a) a remaining battery power of said SES device is below a pre-defined threshold value, and also (b) a non-Wi-Fi low-power wireless signal is transmitted from the SES device to the other SES unit to trigger said other SES unit to operate as Internet gateway for said SES device.

In some embodiments, the Wi-Fi transceiver of the SES device is configured: (a) to communicate directly over Wi-Fi with a Wi-Fi router in said venue; (b) to receive from said Wi-Fi router a Wi-Fi signal indicating an operational command that is destined to said other SES unit; wherein the non-Wi-Fi low-power wireless transmitter is to transmit a non-Wi-Fi low-power wireless signal to said other SES unit, indicating said operational command to said other SES unit.

In some embodiments, the Wi-Fi transceiver of the SES device is configured: (a) to communicate directly over Wi-Fi with a Wi-Fi router in said venue; (b) to receive from said Wi-Fi router a Wi-Fi signal indicating an operational command that is destined to said other SES unit; wherein the non-Wi-Fi low-power wireless transmitter is to transmit a Bluetooth Low Energy (BLE) wireless signal (and/or a Bluetooth Mesh Networking signal) to said other SES unit, indicating said operational command to said other SES unit.

In some embodiments, said SES device is configured, (a) to operate, during a first time-slot, as a master Wi-Fi gateway which serves one or more other SES units in said venue; and (b) to operate, during a second time-slot, as a slave SES device which receives operational commands over a non-Wi-Fi wireless communication link from another SES unit which operates as master Wi-Fi gateway.

In some embodiments, said SES device is to trigger said other SES unit, to switch from being a Wi-Fi slave unit to being a Wi-Fi master gateway, if a remaining non-mains power capacity of said other SES unit is greater than a pre-defined threshold value.

In some embodiments, said SES device is to trigger said other SES unit, to switch from being a Wi-Fi slave unit to being a Wi-Fi master gateway, if a remaining non-mains battery power of said other SES unit is greater than a remaining non-mains battery power of said SES device.

In some embodiments, said SES device is to trigger said other SES unit, to switch from being a Wi-Fi slave unit to being a Wi-Fi master gateway, based on a voting mechanism in which two or more SES units determine which SES unit is to become the Wi-Fi master gateway by taking into account at least the remaining non-mains battery power of at least one of the SES units.

In some embodiments, said SES device is configured: (a) to communicate via Wi-Fi with a home automation hub in said venue; and (b) to relay an operational command, that was transmitted via Wi-Fi by said home automation hub, to a non-Wi-Fi connected SES unit, via a non-Wi-Fi wireless communication link.

In some embodiments, a smart electric shade (SES) system comprises: a first SES unit, and a second SES unit that is separate from the first SES unit. The first SES unit comprises: (a1) a first window blind; (a2) a first motor able to open and close the first window blind; (a3) a first Wi-Fi transceiver; (a4) a first non-Wi-Fi reduced-power wireless transceiver. The second SES unit comprises: (b1) a second window blind; (b2) a second motor able to open and close the second window blind; (b3) a second Wi-Fi transceiver; (b4) a second non-Wi-Fi reduced-power wireless transceiver. The first Wi-Fi transceiver is to receive an incoming Wi-Fi signal indicating a remote command to control the second SES unit. The first non-Wi-Fi reduced-power wireless transceiver of the first SES unit, is to send to the second non-Wi-Fi reduced-power wireless transceiver of the second SES unit, a non-Wi-Fi wireless communication signal, based on said incoming Wi-Fi command, indicating said remote command to control said second SES unit.

In some embodiments, during a first time-slot, the first Wi-Fi transceiver of the first SES unit is operational and the second Wi-Fi transceiver of the second SES unit is non-operational; wherein during a second time-slot, the first Wi-Fi transceiver of the first SES unit is non-operational and the second Wi-Fi transceiver of the second SES unit is operational; wherein during both the first and second time-slots, the first non-Wi-Fi reduced-power wireless transceiver of the first SES unit is operational; wherein during both the first and second time-slots, the second non-Wi-Fi reduced-power wireless transceiver of the second SES unit is operational.

In some embodiments, if a pre-defined condition holds true, (a) the first Wi-Fi transmitter of the first SES unit switches from being operational to being non-operational, and (b) the first non-Wi-Fi reduced-power transceiver of the first SES unit transmits a non-Wi-Fi reduced-power wireless signal which triggers the second Wi-Fi transceiver of the second SES unit to switch from being non-operational to being operational.

In some embodiments, if a battery that powers the first Wi-Fi transceiver of the first SES unit has remaining power that is less than a pre-defined condition holds true, then: (a) the first Wi-Fi transmitter of the first SES unit switches from being operational to being non-operational, and (b) the first non-Wi-Fi reduced-power transceiver of the first SES unit transmits a non-Wi-Fi reduced-power wireless signal which triggers the second Wi-Fi transceiver of the second SES unit to switch from being non-operational to being operational.

In some embodiments, at least one of the first and second SES units comprises a battery that provides electric power to said Wi-Fi transceiver and to said non-Wi-Fi transceiver, and excludes any mains-connected power source.

Some embodiments may include a non-transitory storage medium or storage article having stored thereon instructions or code that, when executed by a machine or a hardware processor, cause such machine or hardware processor to perform a method as described.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Some embodiments may be implemented by utilizing any suitable combination of hardware and/or software components; as well as other suitable units or sub-units, processors, controllers, DSPs, FPGAs, CPUs, Integrated Circuits, output units, input units, memory units, long-term or short-term storage units, buffers, power source(s), wired links, wireless communication links, transceivers, Operating System(s), software applications, drivers, or the like.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Discussions herein utilizing terms such as, for example, "processing", "computing", "calculating", "generating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device. The implementation may also comprise a plug-in or extension or add-on or a software patch or a software update or a software modification to an existing design software (such as Adobe Photoshop) or to a workflow software (such as Workfront), to allow users to efficiently and rapidly access the system of the present without leaving their operational environment and/or from within such software or application, and to allow.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A smart electric shade (SES) device, comprising:
   a window blind;
   a motor able to open and close the window blind;
   a Wi-Fi transceiver able to receive an incoming Wi-Fi signal indicating a remote command to control another SES unit that is external to and separate from said SES device;
   a non-Wi-Fi reduced-power wireless transceiver, to send to said other SES unit a non-Wi-Fi wireless communication signal, based on said incoming Wi-Fi command, indicating said remote command to control said other SES unit.

2. The SES device of claim 1,
   wherein the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit.

3. The SES device of claim 1,
   wherein the non-Wi-Fi reduced-power wireless transceiver is a Bluetooth Low Energy (BLE) transceiver which is configured to send to said other SES unit a BLE wireless communication signal, based on said incoming Wi-Fi command, indicating said remote command to control said other SES unit.

4. The SES device of claim 1,
   wherein the Wi-Fi transceiver is battery powered and is non-mains powered.

5. The SES device of claim 1,
   wherein the Wi-Fi transceiver is battery powered and is non-mains powered;

wherein the SES device switches said Wi-Fi transceiver between
(i) a first operational mode in which said SES device operates as an Internet gateway for a plurality of SES devices and in which said Wi-Fi transceiver is activated, and
(ii) a second operational mode in said other SES unit operates as the Internet gateway and in which said Wi-Fi transceiver of said SES device is deactivated.

6. The SES device of claim 1,
wherein the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit;
wherein said Sub-1 GHz transceiver transmits to the other SES unit said Sub-1 GHz wireless communication signal at a frequency selected from the group consisting of:
315 MHz, 415 MHz, 426 MHz, 433 MHz, 434 MHz, 468 MHz, 470 MHz, 769 MHz, 779 MHz, 863 MHz, 915 MHz, 920 MHz, 925 MHz.

7. The SES device of claim 1,
wherein the non-Wi-Fi reduced-power wireless transceiver is a Sub-1 GHz transceiver which is configured to send to said other SES unit a Sub-1 GHz wireless communication signal, based on said incoming Wi-Fi command, indicating said remote command to control said other SES unit;
wherein said Sub-1 GHz transceiver transmits to the other SES unit said Sub-1 GHz wireless communication signal at a frequency that is greater than 300 MHz and is smaller than 950 MHz.

8. The SES device of claim 1,
wherein the Wi-Fi transceiver is battery powered and is non-mains powered;
wherein the SES device switches said Wi-Fi transceiver between
(i) a first operational mode in which said SES device operates as an Internet gateway for a plurality of SES devices and in which said Wi-Fi transceiver is activated, and
(ii) a second operational mode in said other SES unit operates as the Internet gateway and in which said Wi-Fi transceiver of said SES device is deactivated;
wherein said Wi-Fi transceiver is switched from the first operational mode to the second operational mode if (a) a remaining battery power of said SES device is below a pre-defined threshold value, and also (b) a non-Wi-Fi low-power wireless signal is transmitted from the SES device to the other SES unit to trigger said other SES unit to operate as Internet gateway for said SES device.

9. The SES device of claim 1,
wherein the Wi-Fi transceiver of the SES device is configured: (a) to communicate directly over Wi-Fi with a Wi-Fi router; (b) to receive from said Wi-Fi router a Wi-Fi signal indicating an operational command that is destined to said other SES unit;
wherein the non-Wi-Fi low-power wireless transmitter is to transmit a non-Wi-Fi low-power wireless signal to said other SES unit, indicating said operational command to said other SES unit.

10. The SES device of claim 1,
wherein the Wi-Fi transceiver of the SES device is configured: (a) to communicate directly over Wi-Fi with a Wi-Fi router; (b) to receive from said Wi-Fi router a Wi-Fi signal indicating an operational command that is destined to said other SES unit;
wherein the non-Wi-Fi low-power wireless transmitter is to transmit a Bluetooth Low Energy (BLE) wireless signal to said other SES unit, indicating said operational command to said other SES unit.

11. The SES device of claim 1,
wherein said SES device is configured, (a) to operate, during a first time-slot, as a master Wi-Fi gateway which serves one or more other SES units; and (b) to operate, during a second time-slot, as a slave SES device which receives operational commands over a non-Wi-Fi wireless communication link from another SES unit which operates as master Wi-Fi gateway.

12. The SES device of claim 1,
wherein said SES device is to trigger said other SES unit, to switch from being a Wi-Fi slave unit to being a Wi-Fi master gateway, if a remaining non-mains power capacity of said other SES unit is greater than a pre-defined threshold value.

13. The SES device of claim 1,
wherein said SES device is to trigger said other SES unit, to switch from being a Wi-Fi slave unit to being a Wi-Fi master gateway, if a remaining non-mains battery power of said other SES unit is greater than a remaining non-mains battery power of said SES device.

14. The SES device of claim 1,
wherein said SES device is to trigger said other SES unit, to switch from being a Wi-Fi slave unit to being a Wi-Fi master gateway, based on a voting mechanism in which two or more SES units determine which SES unit is to become the Wi-Fi master gateway by taking into account at least the remaining non-mains battery power of at least one of the SES units.

15. The SES device of claim 1,
wherein said SES device is configured: (a) to communicate via Wi-Fi with a home automation hub; and (b) to relay an operational command, that was transmitted via Wi-Fi by said home automation hub, to a non-Wi-Fi connected SES unit, via a non-Wi-Fi wireless communication link.

16. A smart electric shade (SES) system, comprising:
a first SES unit, and a second SES unit that is separate from the first SES unit;
wherein the first SES unit comprises:
(a1) a first window blind;
(a2) a first motor able to open and close the first window blind;
(a3) a first Wi-Fi transceiver;
(a4) a first non-Wi-Fi reduced-power wireless transceiver;
wherein the second SES unit comprises:
(b1) a second window blind;
(b2) a second motor able to open and close the second window blind;
(b3) a second Wi-Fi transceiver;
(b4) a second non-Wi-Fi reduced-power wireless transceiver;
wherein the first Wi-Fi transceiver is to receive an incoming Wi-Fi signal indicating a remote command to control the second SES unit;
wherein the first non-Wi-Fi reduced-power wireless transceiver of the first SES unit, is to send to the second non-Wi-Fi reduced-power wireless transceiver of the second SES unit, a non-Wi-Fi wireless communication signal, based on said incoming Wi-Fi command, indicating said remote command to control said second SES unit.

17. The SES system of claim 16,
wherein during a first time-slot, the first Wi-Fi transceiver of the first SES unit is operational and the second Wi-Fi transceiver of the second SES unit is non-operational;
wherein during a second time-slot, the first Wi-Fi transceiver of the first SES unit is non-operational and the second Wi-Fi transceiver of the second SES unit is operational;
wherein during both the first and second time-slots, the first non-Wi-Fi reduced-power wireless transceiver of the first SES unit is operational;
wherein during both the first and second time-slots, the second non-Wi-Fi reduced-power wireless transceiver of the second SES unit is operational.

18. The SES system of claim 16,
wherein, if a pre-defined condition holds true, (a) the first Wi-Fi transmitter of the first SES unit switches from being operational to being non-operational, and (b) the first non-Wi-Fi reduced-power transceiver of the first SES unit transmits a non-Wi-Fi reduced-power wireless signal which triggers the second Wi-Fi transceiver of the second SES unit to switch from being non-operational to being operational.

19. The SES system of claim 16,
wherein, if a battery that powers the first Wi-Fi transceiver of the first SES unit has remaining power that is less than a pre-defined condition holds true, then,
(a) the first Wi-Fi transmitter of the first SES unit switches from being operational to being non-operational, and
(b) the first non-Wi-Fi reduced-power transceiver of the first SES unit transmits a non-Wi-Fi reduced-power wireless signal which triggers the second Wi-Fi transceiver of the second SES unit to switch from being non-operational to being operational.

20. The SES system of claim 16,
wherein at least one of the first and second SES units comprises a battery that provides electric power to said Wi-Fi transceiver and to said non-Wi-Fi transceiver, and excludes any mains-connected power source.

\* \* \* \* \*